Figure 1:
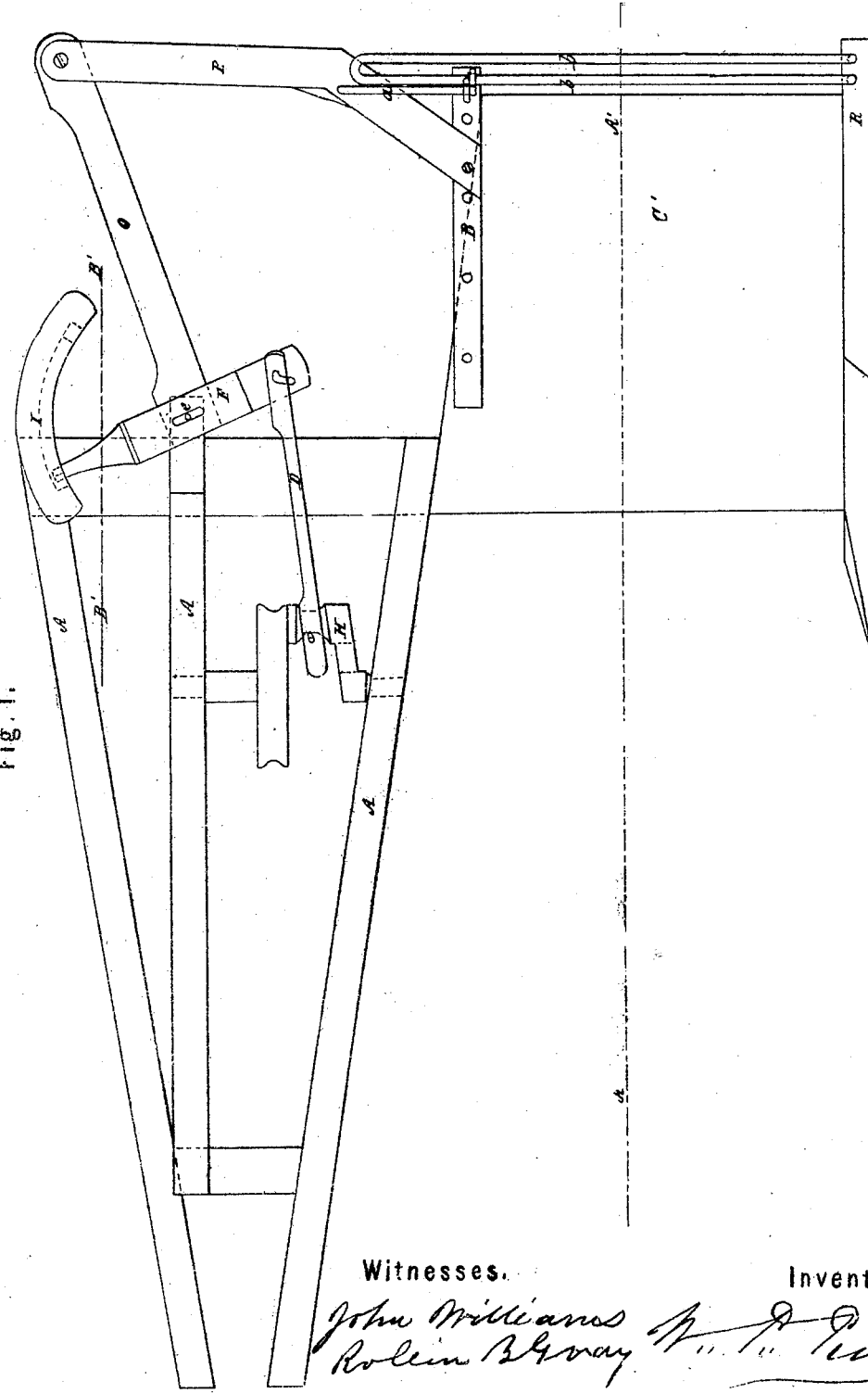

W. P. Penn.
Harvester Rake
Nº 28010  Patented Apr. 24, 1860

Witnesses.  Inventor.
John Williams
Rollin B. Gray  W. P. Penn

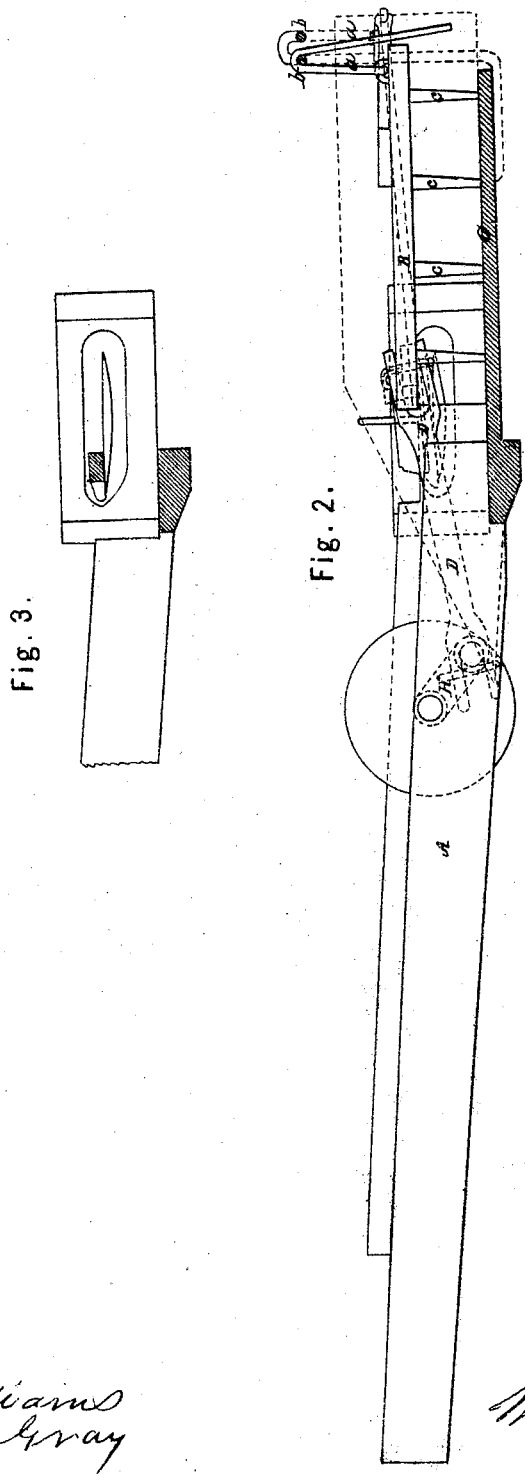

UNITED STATES PATENT OFFICE.

WORDEN P. PENN, OF BELLEVILLE, ILLINOIS.

IMPROVEMENT IN RAKES FOR HARVESTERS.

Specification forming part of Letters Patent No. 28,010, dated April 24, 1860.

*To all whom it may concern:*

Be it known that I, WORDEN P. PENN, of Belleville, in St. Clair county, and State of Illinois, have invented a new and useful Improvement in Reaping-Machines; and I do hereby declare that the following is a full, clear, and exact description of the same, reference being had to the annexed drawings, making part of this specification, in which—

Figure 1 is a top view, Fig. 2 a section through A' A', and Fig. 3 a section through B' B', of my said improvements.

To enable any one skilled in the arts to which my improvement appertains to make and use the same, I will proceed to describe the construction and operation thereof.

Similar letters of reference represent corresponding parts of the different figures of the drawings annexed.

Upon the drawings, A represents the frame, to the lower end of which I fix a shoe, (shown at I,) and in the face of the said shoe I cut a groove, which is in the nature of an eccentric or cam, as shown at 1, Fig. 3. In this eccentric groove I introduce the end of the lever F. This lever I fix upon a fulcrum in the frame A, as shown at r, so that the said lever has a universal movement about the said fulcrum.

To the lever F, I attach the lever O in a rigid unyielding manner, so that the motion of the lever O will be governed by the motion of the lever F, as well in kind as in extent.

To the end of the lever O, I attach the shaft P of the rake B, and in this shaft P and to the rake B, I attach a guide-bracket, a, which is made to work upon the guides b b, which are fixed in the outside frame-piece, R, of the platform c'.

To one end of the lever F, I attach the connecting-rod D by means of a universal joint of any description, and the opposite end of the connecting-rod D, I connect to the crank H, also by means of a universal connection, so that the said rod can vibrate as well upon a horizontal plane as a vertical one. Now, when the machine is in operation, the rod D causes the lever F to vibrate upon a horizontal plane, while at the same time the eccentric groove causes it to vibrate upon a vertical plane, and the horizontal movement of the said lever causes the rake B to move to and fro across the platform c', and the vertical movement of the said lever causes the shaft P to lift the rake off of the platform upon its backward motion, so as to clear the grain or straw, that it may not heap it up or push it off of the outside of the platform. It will be seen that this invention consist in certain means of moving the rake across the platform upon straight parallel lines, which means consist of the arrangement and combination of the levers F and O, with the crank H, connecting-rod D, shaft P, and guides b b, and also in a certain means of raising the rake off of the platform upon its backward motion, which means consists of the combination of the aforesaid arrangement of levers with the grooved shoe I.

I am aware that these devices severally considered have been employed for giving the horizontally-reciprocating and vertical movements to the automatic rake of the harvester, but believe that I am the first to connect and arrange them in the manner described. I therefore do not claim these devices separately; but What I do claim, and desire to secure by Letters Patent, is—

The levers F and O, rigidly connected together and loosely pivoted at e, in combination with the crank H, connecting-rod D, shaft P, and guide-rods b b, grooved shoe I, and platform C, the whole constructed and arranged substantially as described.

W. P. PENN.

Witnesses:
 ROBIN B. GRAY,
 JOHN WILLIAMS.